US009363731B1

(12) United States Patent
Yang et al.

(10) Patent No.: US 9,363,731 B1
(45) Date of Patent: Jun. 7, 2016

(54) TRAFFIC VOLUME MEASUREMENT REPORTING

(71) Applicant: QUALCOMM Incorporated, San Diego, CA (US)

(72) Inventors: Ming Yang, San Diego, CA (US); Tom Chin, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/593,740

(22) Filed: Jan. 9, 2015

(51) Int. Cl.
*H04W 36/22* (2009.01)
*H04W 36/30* (2009.01)
*H04W 36/14* (2009.01)
*H04W 36/00* (2009.01)

(52) U.S. Cl.
CPC .......... *H04W 36/30* (2013.01); *H04W 36/0088* (2013.01); *H04W 36/14* (2013.01); *H04W 36/22* (2013.01)

(58) Field of Classification Search
None
See application file for complete search history.

(56) References Cited

U.S. PATENT DOCUMENTS

| 7,643,830 | B2 | 1/2010 | Catovic et al. | |
| 8,681,736 | B2 | 3/2014 | Nader et al. | |
| 9,125,114 | B2 * | 9/2015 | Yang | H04W 36/0088 |
| 9,155,006 | B2 * | 10/2015 | Lee | H04W 36/0005 |
| 2008/0014957 | A1 * | 1/2008 | Ore | H04W 36/0088 455/452.1 |
| 2009/0196230 | A1 * | 8/2009 | Kim | H04W 74/002 370/328 |
| 2010/0234014 | A1 | 9/2010 | Virkki et al. | |
| 2011/0263262 | A1 | 10/2011 | Min et al. | |
| 2013/0122918 | A1 * | 5/2013 | Boley | H04W 76/046 455/450 |
| 2013/0301498 | A1 | 11/2013 | Kanamarlapudi et al. | |
| 2015/0208311 | A1 * | 7/2015 | Lee | H04W 24/10 455/436 |
| 2015/0327054 | A1 * | 11/2015 | Callender | H04W 8/183 370/329 |

FOREIGN PATENT DOCUMENTS

| EP | 1848227 A1 | 10/2007 |
| GB | 2510504 A | 8/2014 |
| WO | 2015184577 A1 | 12/2015 |

OTHER PUBLICATIONS

Chou S.F., et al., "An efficient measurement report mechanism for Long Term Evolution networks," IEEE 22nd International Symposium on Personal Indoor and Mobile Radio Communications (PIMRC), 2011, pp. 197-201.
International Search Report and Written Opinion—PCT/US2015/067183—ISA/EPO—Mar. 14, 2016.

* cited by examiner

*Primary Examiner* — Diane Mizrahi
(74) *Attorney, Agent, or Firm* — Seyfarth Shaw LLP

(57) ABSTRACT

A user equipment (UE) speed up handover/redirection when the user equipment is in a coverage area of multiple radio access technologies (RATs). In one instance the user equipment determines whether to transmit an uplink (UL) reconfiguration message. The user equipment delays transmission of the uplink reconfiguration message when a transition from a serving radio access technology to a non-serving preferred radio access technology has been initiated while the UE is on a packet switched (PS) data call.

20 Claims, 8 Drawing Sheets

TRAFFIC VOLUME MEASUREMENT REPORTING

BACKGROUND

1. Field

Aspects of the present disclosure relate generally to wireless communication systems, and more particularly, to delaying, at a user equipment (UE), transmission traffic volume measurement reporting in a wireless network when a transition from a serving radio access technology (RAT) to a non-serving preferred RAT is initiated.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the universal terrestrial radio access network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to global system for mobile communications (GSM) technologies, currently supports various air interface standards, such as wideband-code division multiple access (W-CDMA), time division-code division multiple access (TD-CDMA), and time division-synchronous code division multiple access (TD-SCDMA). For example, China is pursuing TD-SCDMA as the underlying air interface in the UTRAN architecture with its existing GSM infrastructure as the core network. The UMTS also supports enhanced 3G data communications protocols, such as high speed packet access (HSPA), which provides higher data transfer speeds and capacity to associated UMTS networks. HSPA is a collection of two mobile telephony protocols, high speed downlink packet access (HSDPA) and high speed uplink packet access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to one aspect of the present disclosure, a method for wireless communication includes delaying, at a user equipment (UE), transmission of an uplink (UL) reconfiguration message when a transition from a serving radio access technology (RAT) to a non-serving preferred RAT has been initiated while the UE is on a packet switched (PS) data call.

According to another aspect of the present disclosure, an apparatus for wireless communication includes means for determining whether to transmit an uplink (UL) reconfiguration message. The apparatus also includes means for delaying, at a user equipment (UE), transmission of the uplink reconfiguration message when a transition from a serving radio access technology (RAT) to a non-serving preferred RAT has been initiated while the UE is on a packet switched (PS) data call.

Another aspect discloses an apparatus for wireless communication and includes a memory and at least one processor coupled to the memory. The processor(s) is configured to delay, at a user equipment (UE), transmission of an uplink (UL) reconfiguration message when a transition from a serving radio access technology (RAT) to a non-serving preferred RAT has been initiated while the UE is on a packet switched (PS) data call.

Yet another aspect discloses a computer program product for wireless communications in a wireless network having a non-transitory computer-readable medium. The computer readable medium has non-transitory program code recorded thereon which, when executed by the processor(s), causes the processor(s) to delay, at a user equipment (UE), transmission of an uplink (UL) reconfiguration message when a transition from a serving radio access technology (RAT) to a non-serving preferred RAT has been initiated while the UE is on a packet switched (PS) data call.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
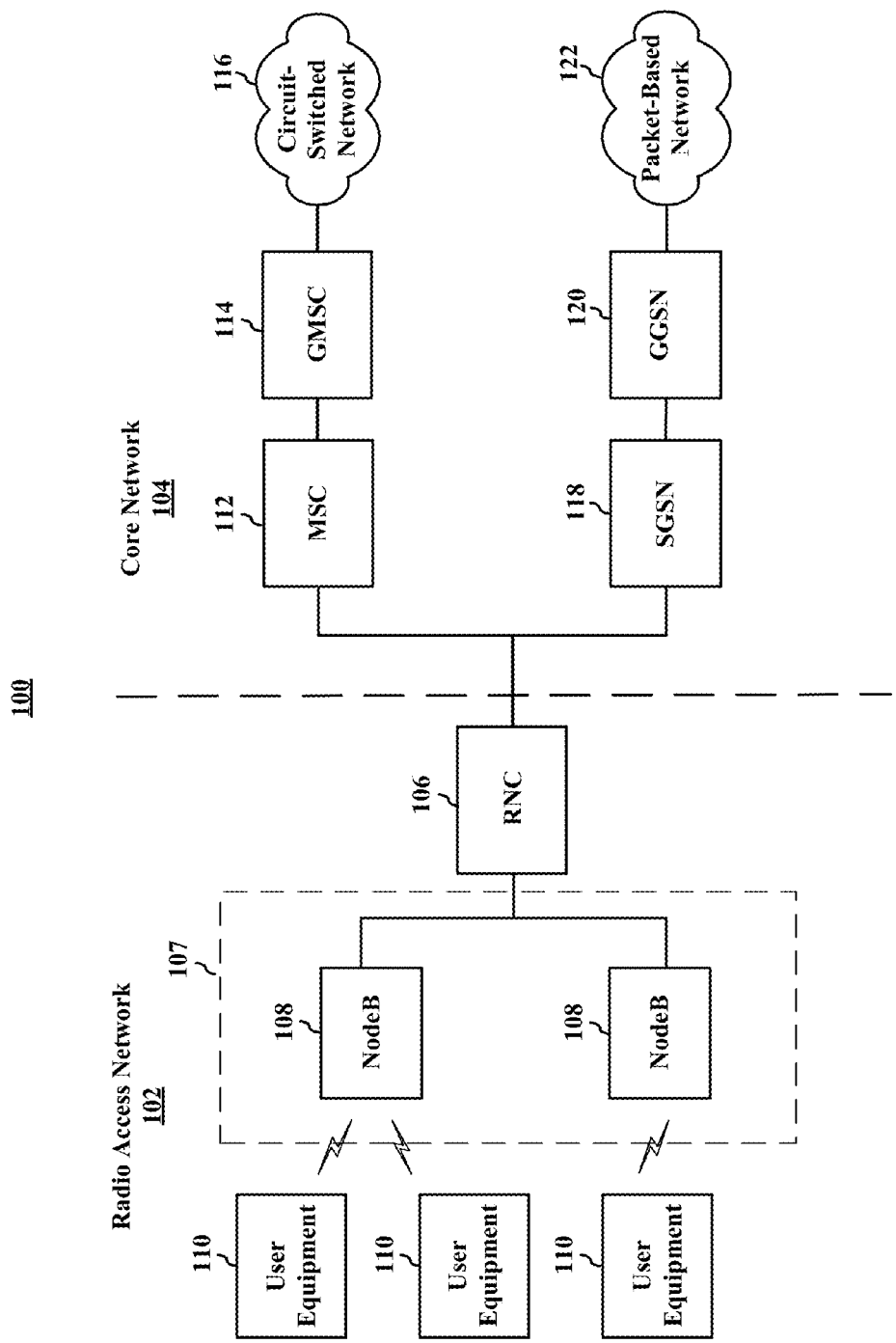
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of radio network subsystems (RNSs) such as an RNS 107, each controlled by a radio network controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
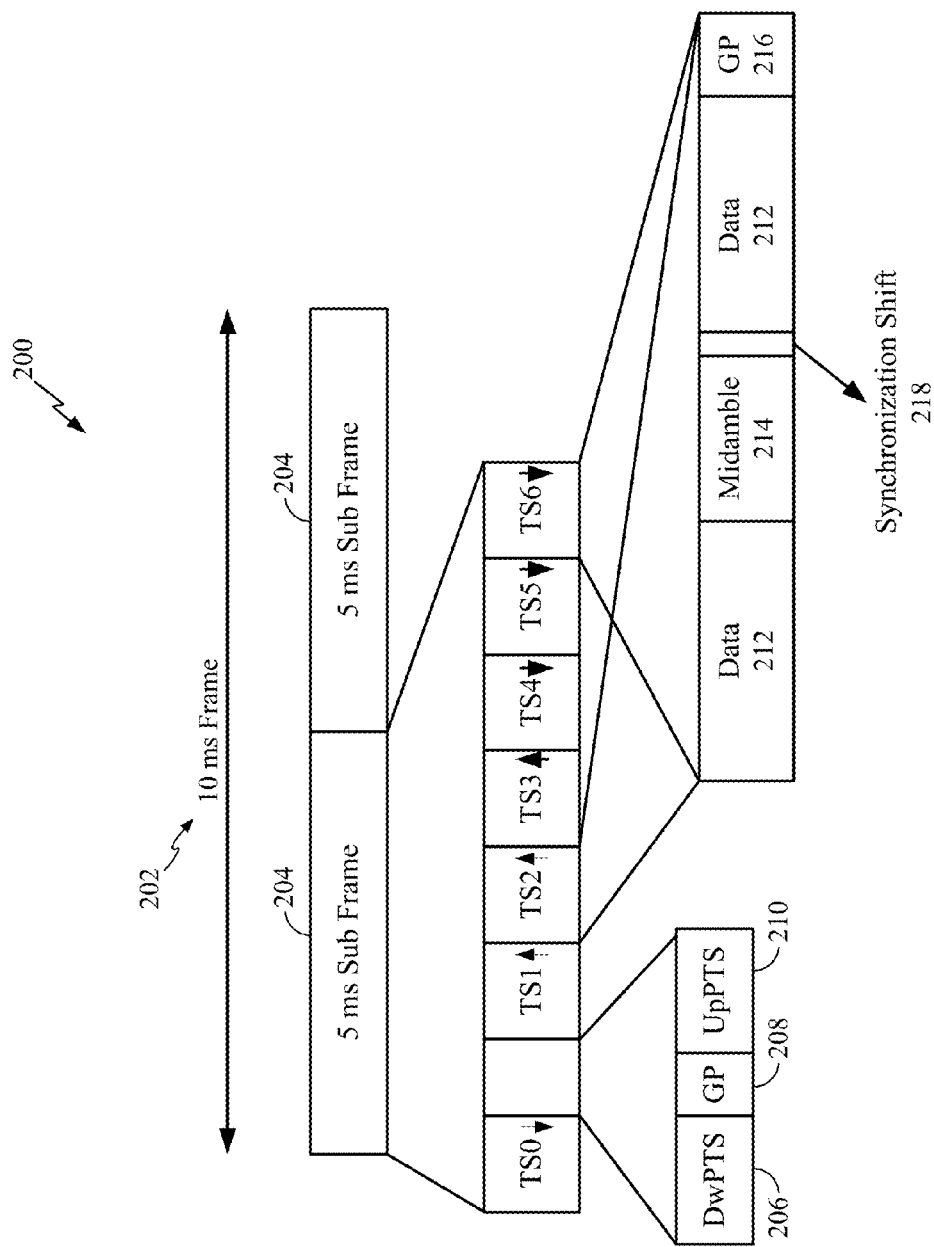
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS)

210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization shift bits 218 only appear in the second part of the data portion. The synchronization shift bits 218 immediately following the midamble can indicate three cases: decrease shift, increase shift, or do nothing in the upload transmit timing. The positions of the synchronization shift bits 218 are not generally used during uplink communications.

Figure 3:
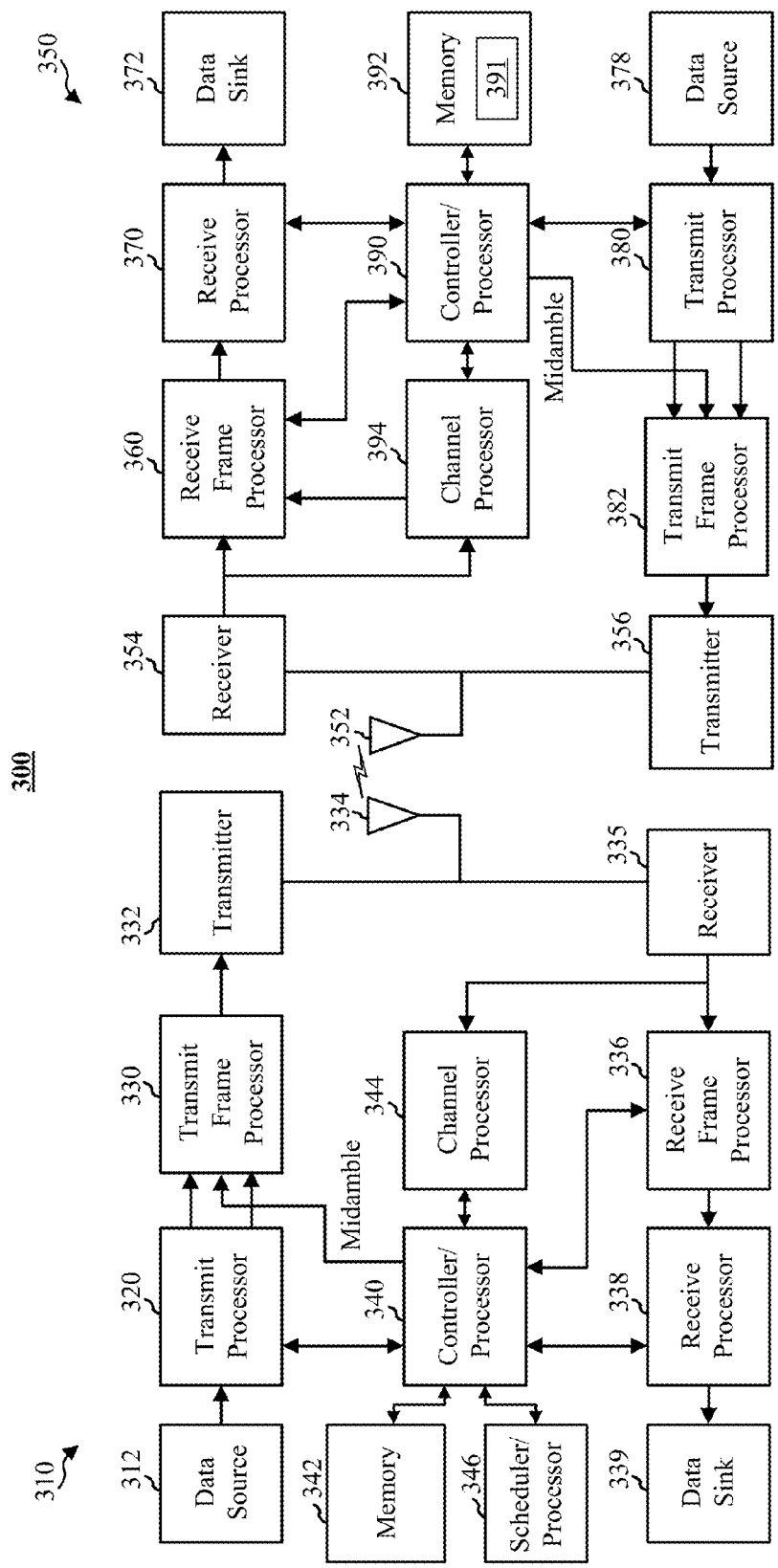
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames. Additionally, a scheduler/processor 346 at the node B 310 may be used to allocate resources to the UEs and schedule downlink and/or uplink transmissions for the UEs.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer-readable media of memories 342 and 392 may store data and software for the node B 310 and the UE 350, respectively. For example, the memory 392 of the UE 350 may store a delay module 391 which, when executed by the controller/processor 390, configures the UE 350 to delay transmission of an uplink transmission reconfiguration message when a transition from a serving RAT to a non-serving preferred RAT has been initiated while the UE is on a packet switched data call.

Figure 4:
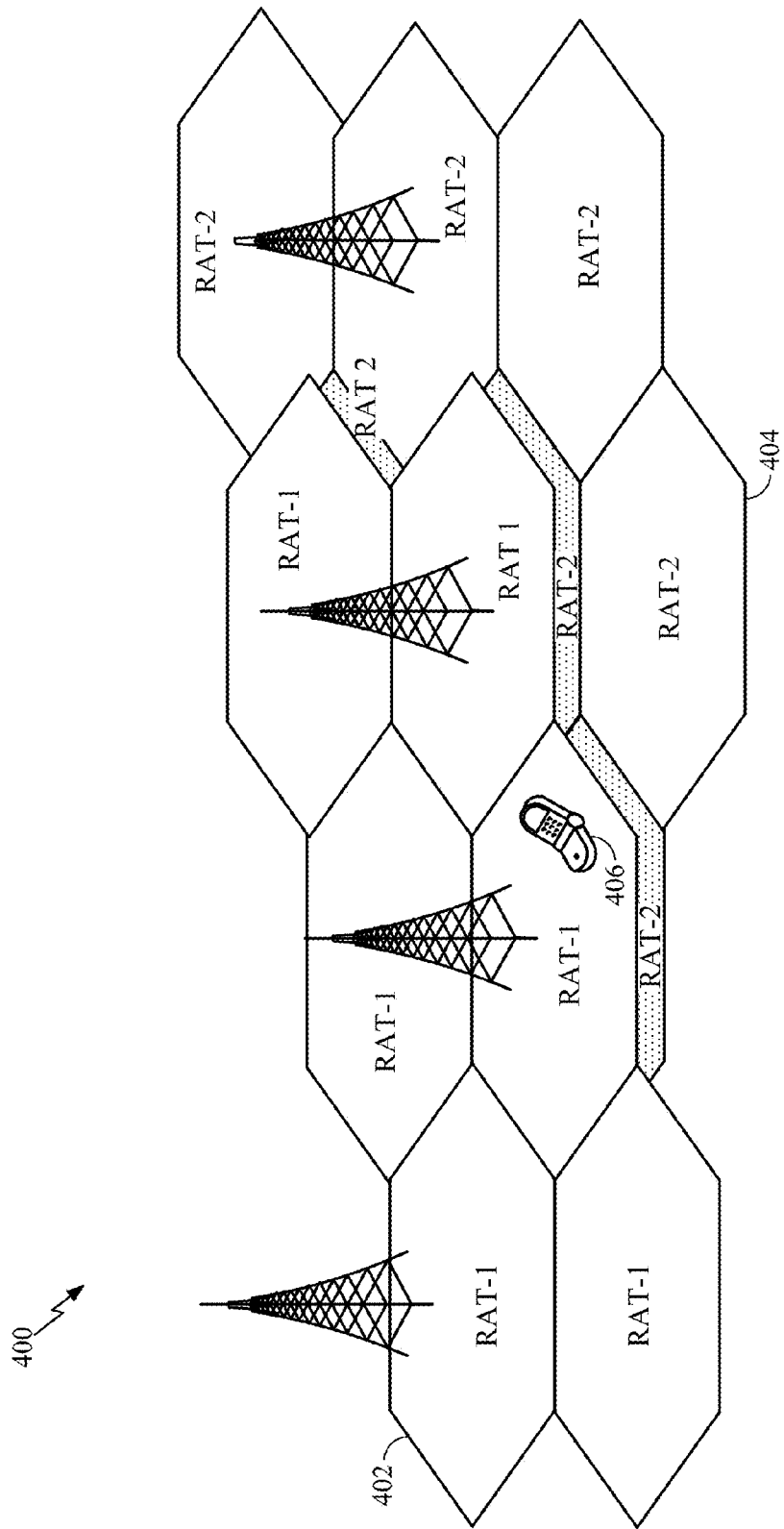
FIG. 4 illustrates network coverage areas according to aspects of the present disclosure.

Some networks, such as a newly deployed network, may cover only a portion of a geographical area. Another network, such as an older more established network, may better cover the area, including remaining portions of the geographical area. FIG. 4 illustrates coverage of an established network utilizing a first type of radio access technology (RAT-1), such as a TD-SCDMA or GSM and also illustrates a newly deployed network utilizing a second type of radio access technology (RAT-2), such as a TD-SCDMA or LTE.

The geographical area 400 may include RAT-1 cells 402 and RAT-2 cells 404. In one example, the RAT-1 cells are TD-SCDMA cells and the RAT-2 cells are LTE cells. A third RAT (RAT-3) (not shown) may also be present. RAT-3 may be GSM cells. Those skilled in the art will appreciate that other types of radio access technologies may be used within the cells. A user equipment (UE) 406 may move from one cell, such as a RAT-1 cell 402, to another cell, such as a RAT-2 cell 404. The movement of the UE 406 may specify a handover or a cell reselection.

The handover or cell reselection may be performed when the UE moves from a coverage area of a first RAT to the coverage area of a second RAT, or vice versa. A handover or cell reselection may also be performed when there is a coverage hole or lack of coverage in one network or when there is traffic balancing between a first RAT and the second RAT networks. As part of that handover or cell reselection process, while in a connected mode with a first system (e.g., TD-SCDMA) a UE may be specified to perform a measurement of one or more neighboring cells, such as LTE cells and GSM cells. For example, the UE may measure the neighbor cells of a second network for signal strength, frequency channel, and base station identity code (BSIC). The UE may then connect to the strongest cell of the second network. Such measurement may be referred to as inter radio access technology (IRAT) measurement.

The UE may send a serving cell a measurement report indicating results of the IRAT measurement performed by the UE. The serving cell may then trigger a handover of the UE to a new cell in the other RAT based on the measurement report. The measurement may include a serving cell signal strength, such as a received signal code power (RSCP) for a pilot channel (e.g., primary common control physical channel (PCCPCH)). The signal strength is compared to a serving system threshold. The serving system threshold can be indicated to the UE through dedicated radio resource control (RRC) signaling from the network. The measurement may also include a neighbor cell received signal strength indicator (RSSI). The neighbor cell signal strength can be compared with a neighbor system threshold. Before handover or cell reselection, in addition to the measurement processes, the base station IDs (e.g., BSICs) are confirmed and re-confirmed.

Handover from the first RAT to the second RAT may be based on event 3A measurement reporting. In one configuration, the event 3A measurement reporting may be triggered based on filtered measurements of the first RAT and the second RAT, a base station identity code (BSIC) confirm procedure of the second RAT and also a BSIC re-confirm procedure of the second RAT. For example, a filtered measurement may be a primary common control physical channel (P-CCPCH) or a primary common control physical shared channel (P-CCPSCH) received signal code power (RSCP) measurement of a serving cell. Other filtered measurements can be of a received signal strength indication (RSSI) of a cell of the second RAT.

Traffic Volume Measurement Reporting

In a conventional network, such as TD-SCDMA, when a UE is in a connected mode for a packet switched (PS) call, the network configures traffic volume reporting events, such as event 4A and event 4B. Based on the traffic volume report, the network may reconfigure an uplink (UL) radio access bearer (RAB) data rate by assigning different uplink radio resources. The reassigning may include assigning a different number of time slots and/or assigning a different number of codes.

TABLE 1 illustrates an example of changes made to the uplink radio access bearer data rate by a conventional network based on a traffic volume reported from the UE.

TABLE 1

| Maximum Number for TBS | TTT [ms] | Data Rate [kbps] | Number of spreading factor (SF) codes | Number of time slots | Pathos loss |
|---|---|---|---|---|---|
| 2 | 20 | 32 | 4 | 1 | 56 |
| 4 | 20 | 64 | 8 | 1 | 60 |
| 8 | 20 | 128 | 16 | 1 | 64 |
| 12 | 20 | 192 | 24 total, 16 in the first time slot and 8 in the second time slot | 2 | 64 |
| 24 | 20 | 384 | 43 total, 16 in both the first time slot and the second time slot, and 11 in the third time slot | 3 | 56 |

Furthermore, in a conventional network, such as a TD-SCDMA network, a UE may measure and report the signal quality and/or signal strength of the serving cell, neighbor cells listed in a neighbor list, and/or cells detected in a list of frequencies. A conventional network may also configure an inter-RAT neighbor cell measurement report event, such as event 3C, and an intra-RAT neighbor cell measurement report event, such as event 3A. In one example, for a TD-SCDMA network, the inter-RAT neighbor cell is a GSM RAT and the intra-RAT neighbor cell is an LTE RAT.

A time to trigger timer for a neighbor cell measurement is triggered when a measurement event condition has been satisfied. In this example, the measurement event condition may be satisfied when a neighbor cell's signal strength or quality is greater than a first threshold value for the measurement report event and the serving cell neighbor cell's signal strength or quality is less than a second threshold value for the measurement report event. Additionally, the UE transmits a neighbor cell measurement report when the time to trigger times expires and a measurement event condition has been satisfied for the duration of the time to trigger. The UE transmits a measurement report to trigger an intra-RAT or an inter RAT handover, a redirection, or a cell change.

Furthermore, when the UE is in a packet switched data call on a 3G network, the network operator may prefer to handover the UE to a 4G network, such as a 4G network with a 3G overlay, even when the signal quality of the 3G serving cell is above a threshold.

Figure 5A:
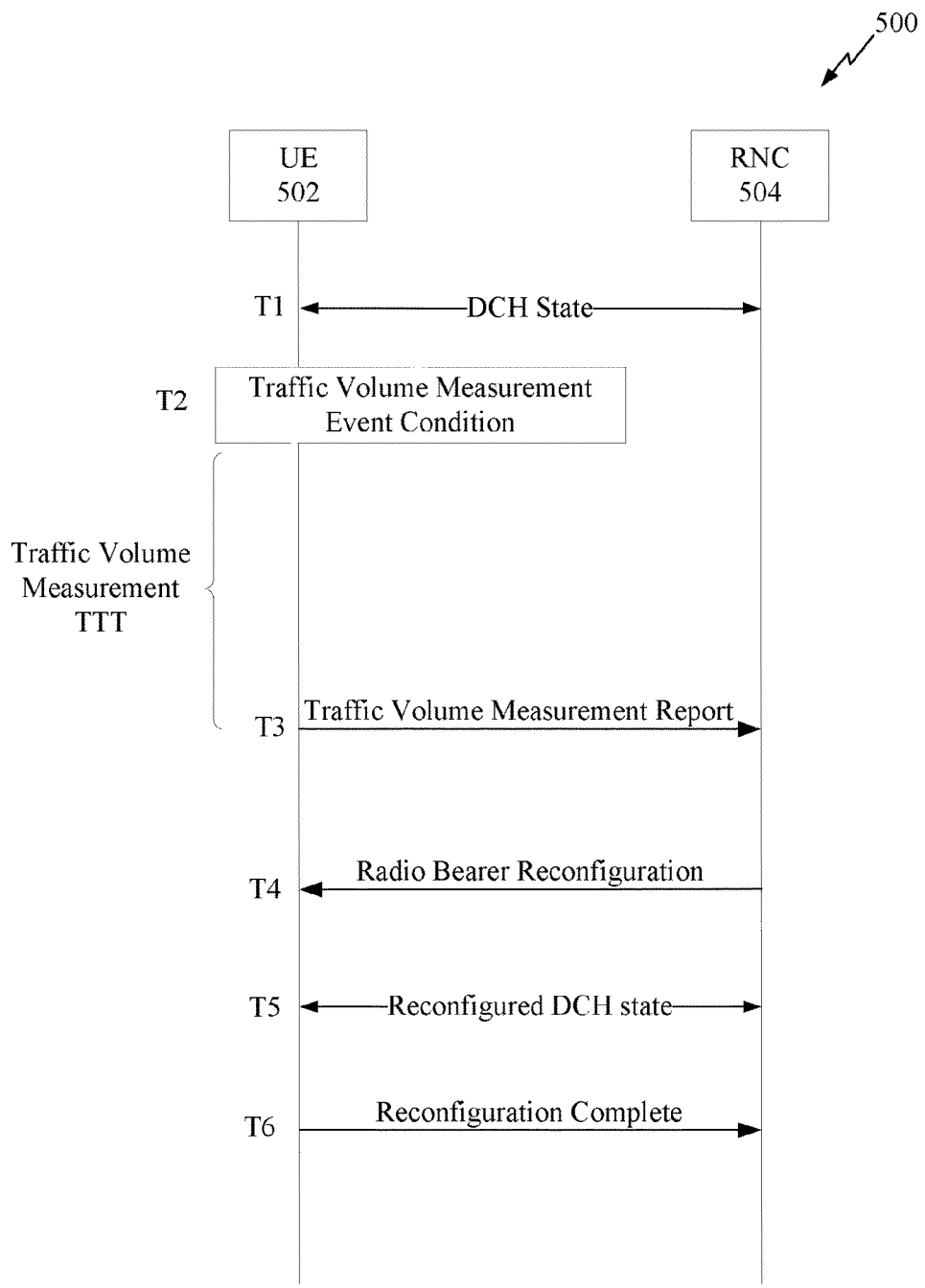
FIG. 5A illustrates an example of a conventional timing diagram for a traffic volume reporting event.

In some cases, when the UE is in a connected mode for a packet switched call, the UE may transmit a traffic volume report for an event, such as event 4A or event 4B, prior to transmitting a measurement report for an event, such as event 3A. In this case, the network may reconfigure the packet switched call to increase/decrease the uplink data rate via a reconfiguration message prior to initiating a handover to an inter-RAT neighbor cell. Reconfiguring the packet switched call prior to performing a handover may delay the process for the inter-RAT handover. Thus, it is desirable to delay the transmission of a traffic volume report when a time to trigger timer for a measurement report is actively running FIG. 5A illustrates an example of a timing diagram 500 for transmission of a traffic volume report for a conventional network. As shown in FIG. 5A, at time T1 the UE 502 is in a dedicated channel (DCH) state with a radio network controller 504. In this example, the UE is in connected mode for a packet switched call with the network. Furthermore, while in the DCH state, at time T2, a traffic volume report event condition for a traffic volume report event, such as event 4A or event 4B, may be satisfied. The traffic volume report event condition may be satisfied when the UE's buffered data is greater than or less than a threshold. Furthermore, a traffic volume report time to trigger timer is initiated when the traffic volume report event condition is satisfied.

Additionally, as shown in FIG. 5A, at the end of the traffic volume report time to trigger period, if the traffic volume report event condition has been satisfied for the duration of the traffic volume report, a traffic volume report is transmitted at time T3. In response to receiving the traffic volume report, the radio network controller 504 transmits a radio bearer reconfiguration message at time T4. The radio bearer reconfiguration message reconfigures the uplink radio access bearer data rate based on the traffic volume report. Specifically, the radio bearer reconfiguration message may reconfigure a number of uplink time slots, a data rate, and/or a number of codes, such as Walsh codes. After performing the reconfiguration, the UE is in a reconfigured DCH state at time T5. Finally, the UE transmits a reconfiguration complete message at time T6.

In one configuration, the UE delays transmitting a traffic volume report when the UE is in a connected mode packet switched call and a time to trigger timer for a neighbor cell measurement is actively running. As previously discussed, in a conventional network, a traffic volume report is transmitted when a traffic volume reporting condition is satisfied. For example, a traffic volume reporting condition is satisfied when data in a buffer of the UE is greater than or less than a threshold for a duration of the time to trigger period. The threshold may be specified by the serving RAT or the network based on the type of event.

Additionally, in the present configuration, when a time to trigger timer for a traffic reporting event expires and a time to trigger timer is actively running for a measurement reporting event for neighbor cell measurement, such as an inter-RAT neighbor cell measurement, the UE delays transmission of the traffic volume report for the traffic volume reporting event, such as event 4A or event 4B. Moreover, the UE determines whether to transmit the traffic volume report based on whether the time to trigger timer for the neighbor cell measurement reporting event expires or resets.

It should be noted that aspects of the present disclosure are directed to transmitting a traffic volume report. Still, aspects of the present disclosure are not limited to traffic volume reports and are also contemplated for other types of messages for reconfiguring uplink transmissions.

Figure 5B:
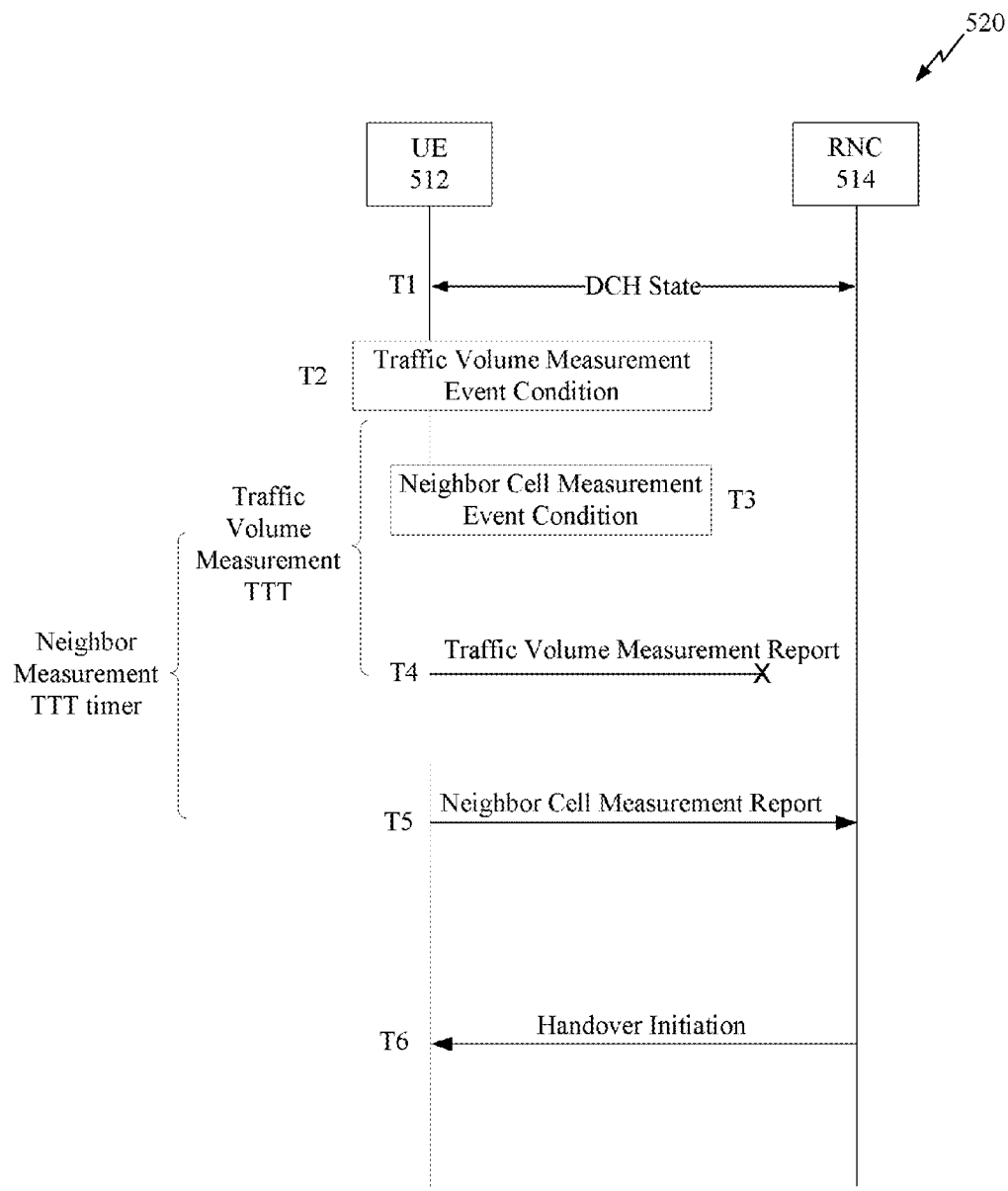
FIG. 5B illustrates an example of a timing diagram for a traffic volume reporting event according to an aspect of the present disclosure.

FIG. 5B illustrates an example of a timing diagram 520 for transmission of a traffic volume report for a conventional network. As shown in FIG. 5A, at time T1, the UE 512 is in a dedicated channel (DCH) state with a radio network controller 514. In this example, the UE is in connected mode for a packet switched call with the network. Furthermore, while in the DCH state, at time T2, a traffic volume report event condition for a traffic volume report event, such as event 4A or event 4B, may be satisfied. The traffic volume report event condition may be satisfied when the UE's buffered data is greater than or less than a threshold. Furthermore, a traffic volume report time to trigger timer is initiated when the traffic volume report event condition is satisfied.

Additionally, as shown in FIG. 5B, at time T3, a neighbor cell measurement event condition may be satisfied. The neighbor cell measurement event condition is for a neighbor cell measurement event, such as event 3A. The neighbor cell measurement event condition may be satisfied when a signal strength and/or signal quality of a neighbor cell is above a threshold. Furthermore, as previously discussed, a neighbor cell measurement report is transmitted if the neighbor cell measurement event condition is satisfied for the duration of the time to trigger period. In one configuration, the neighbor cell measurement event condition is satisfied regardless of the serving cell's signal quality when the neighbor cell's signal quality is above a threshold and the neighbor cell is a high priority RAT. Additionally, in this configuration, when the serving cell's signal quality is less than a threshold, the neighbor cell measurement event condition is satisfied if the neighbor cell's signal quality is above a threshold and the neighbor cell is an equal priority RAT and/or a lower priority RAT in comparison to the serving cell.

Furthermore, in a conventional network, if the traffic volume report event condition has been satisfied for the duration of the traffic volume report time to trigger period, a traffic volume report is transmitted at time T4. Still, in the present configuration, at time T4, the UE delays transmission of a traffic volume report when the UE is in a connected mode packet switched call and a time to trigger timer for a neighbor cell measurement is actively running. Moreover, as shown in FIG. 5B, the UE may transmit a neighbor cell measurement report at time T5 when the neighbor cell measurement time to trigger timer expires. It should be noted that in the present example it is assumed that the neighbor cell measurement event condition was satisfied for the duration of the neighbor cell measurement time to trigger period.

Alternatively, the neighbor cell measurement time to trigger timer resets if the neighbor cell measurement event condition is not satisfied for the duration of the neighbor cell measurement time to trigger period. In the present configuration, the traffic volume report is transmitted if the neighbor cell measurement time to trigger timer resets. Additionally, or alternatively, in one configuration, the traffic volume report is transmitted if the neighbor cell measurement time to trigger timer resets and a traffic volume report event condition is still satisfied.

It should be noted that according to an aspect of the present disclosure, the UE does not delay transmission of a traffic volume report for a traffic volume reporting event when the neighbor cell measurement report time to trigger timer is for an intra-RAT neighbor cell or an intra-frequency neighbor cell. For example, if the UE is in a connected mode packet switched call for a TD-SCDMA network, the UE does not delay transmitting a traffic volume reports for a traffic volume reporting event when the neighbor cell measurement report time to trigger timer is for a TD-SCDMA neighbor cell and/or a 2G neighbor cell. Alternatively, in this example, the UE delays transmission of a traffic volume report for a traffic volume reporting event when the time to trigger timer is actively running for a measurement reporting event of a LTE neighbor cell.

Figure 6:
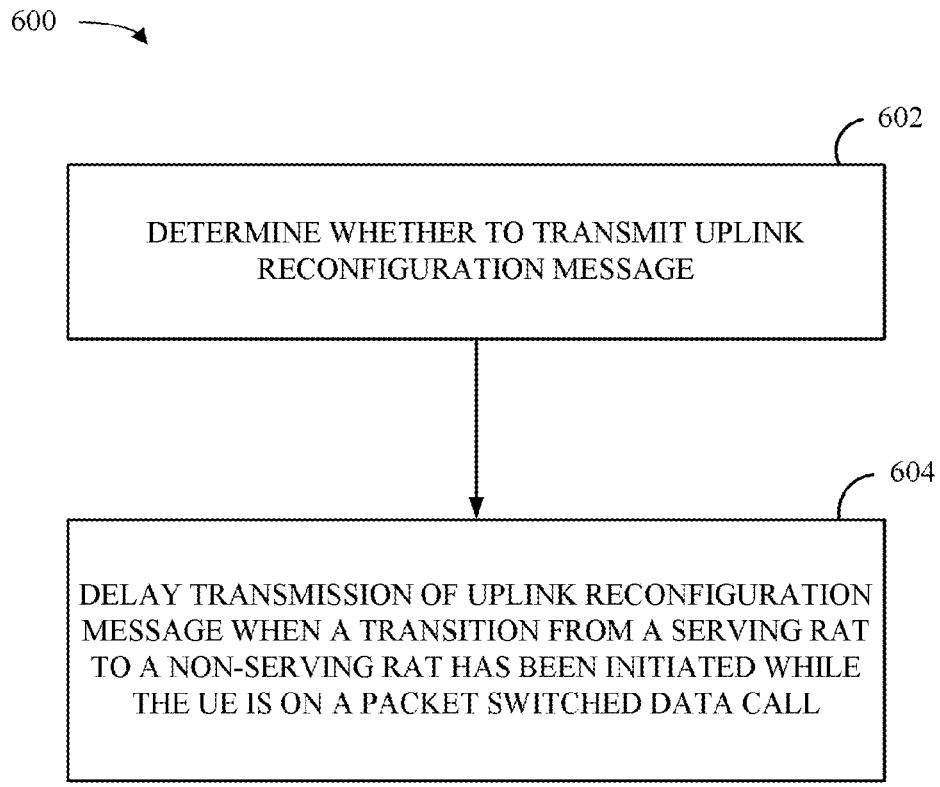
FIG. 6 is a flow diagram illustrating a method for delaying transmission of an uplink reconfiguration message according to one aspect of the present disclosure.

FIG. 6 shows a wireless communication method 600 according to one aspect of the disclosure. A UE determines whether to transmit an uplink reconfiguration message, as shown in block 602. Additionally, the UE delays transmission of an uplink reconfiguration message when a transition from a serving RAT to a non-serving preferred RAT has been initiated while the UE is on a packet switched data call, as shown in block 604.

Figure 7:
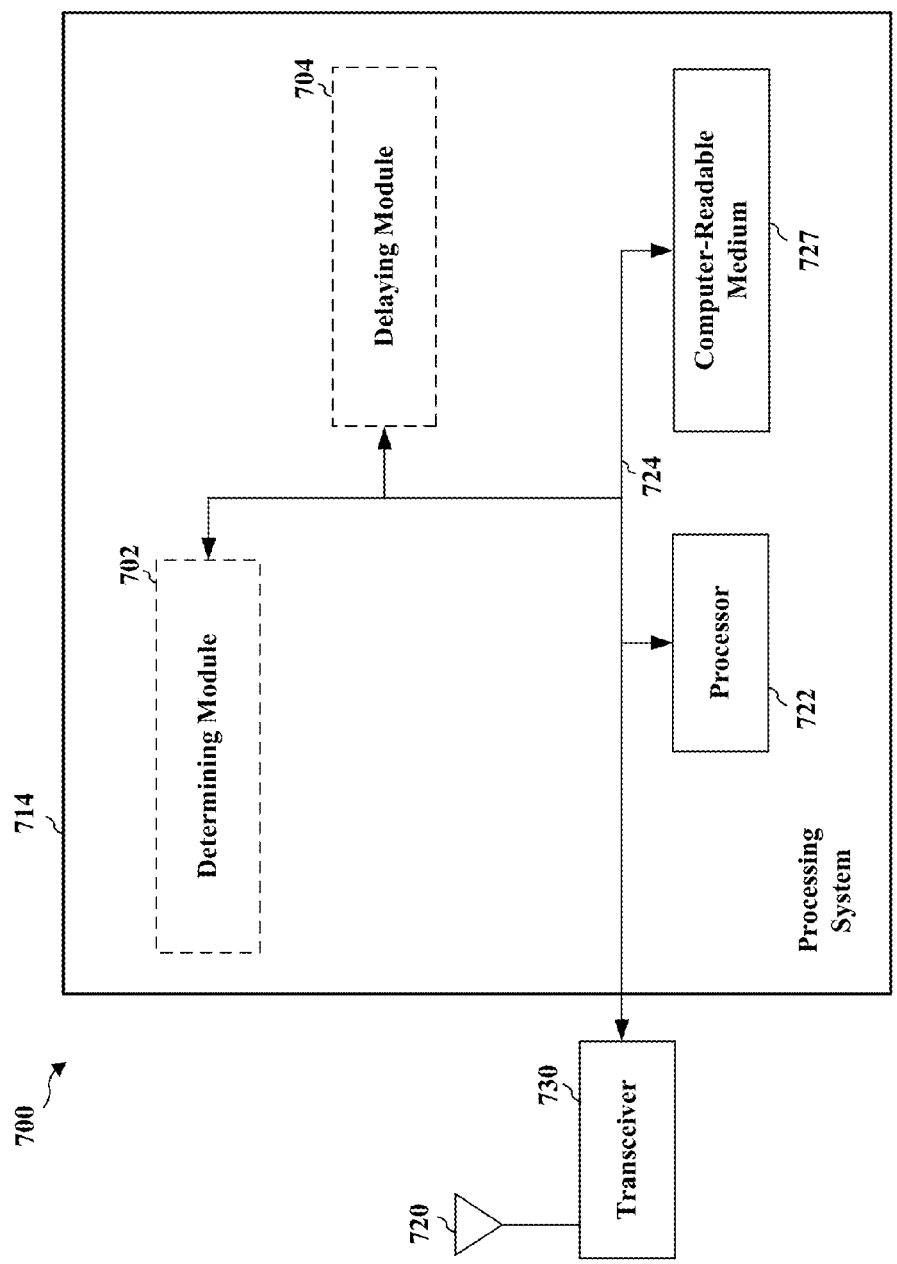
FIG. 7 is a diagram illustrating an example of a hardware implementation for an apparatus employing a processing system according to one aspect of the present disclosure.

FIG. 7 is a diagram illustrating an example of a hardware implementation for an apparatus 700 employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 722 the modules 702, 704, and the non-transitory computer-readable medium 727. The bus 724 may also link various other circuits such as timing sources, peripherals, voltage regulators, and power management circuits, which are well known in the art, and therefore, will not be described any further.

The apparatus includes a processing system 714 coupled to a transceiver 730. The transceiver 730 is coupled to one or more antennas 720. The transceiver 730 enables communicating with various other apparatus over a transmission medium. The processing system 714 includes a processor 722 coupled to a non-transitory computer-readable medium 727. The processor 722 is responsible for general processing, including the execution of software stored on the computer-readable medium 727. The software, when executed by the processor 722, causes the processing system 714 to perform the various functions described for any particular apparatus. The computer-readable medium 727 may also be used for storing data that is manipulated by the processor 722 when executing software.

The processing system 714 includes a determining module 702 for determining whether to transmit an uplink reconfiguration message. The processing system 714 includes a delaying module 704 for delaying a transmission of the uplink reconfiguration message when a transition from a serving RAT to a non-serving RAT has been initiated while the UE is on a packet switched data call. The modules may be software modules running in the processor 722, resident/stored in the computer-readable medium 727, one or more hardware modules coupled to the processor 722, or some combination thereof. The processing system 714 may be a component of the UE 350 and may include the memory 392, and/or the controller/processor 390.

In one configuration, an apparatus such as a UE is configured for wireless communication including means for determining. In one aspect, the determining means may be the channel processor 394, the transmit frame processor 382, the transmit processor 380, the controller/processor 390, the memory 392, determining module 702, and/or the processing system 714 configured to perform the determining means. The UE is also configured to include means for delaying. In one aspect, the delaying means may be the antennas 352, the channel processor 394, the transmitter 356, the transmit frame processor 382, the transmit processor 380, the controller/processor 390, the memory 392, delay module 391, delaying module 704, and/or the processing system 614 configured to perform the delaying means. In one configuration, the means functions correspond to the aforementioned structures. In another aspect, the aforementioned means may be a module or any apparatus configured to perform the functions recited by the aforementioned means.

Several aspects of a telecommunications system has been presented with reference to TD-SCDMA, GSM, and LTE systems. As those skilled in the art will readily appreciate, various aspects described throughout this disclosure may be extended to other telecommunication systems, network architectures and communication standards. By way of example, various aspects may be extended to other UMTS systems such as W-CDMA, high speed downlink packet access (HSDPA), high speed uplink packet access (HSUPA), high speed packet access plus (HSPA+) and TD-CDMA. Various aspects may also be extended to systems employing long term evolution (LTE) (in FDD, TDD, or both modes), LTE-advanced (LTE-A) (in FDD, TDD, or both modes), CDMA2000, evolution-data optimized (EV-DO), ultra mobile broadband (UMB), IEEE 802.11 (Wi-Fi), IEEE 802.16 (WiMAX), IEEE 802.20, ultra-wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

It is also to be understood that the term "signal quality" is non-limiting. Signal quality is intended to cover any type of signal metric such as received signal code power (RSCP), reference signal received power (RSRP), reference signal received quality (RSRQ), received signal strength indicator (RSSI), signal to noise ratio (SNR), signal to interference plus noise ratio (SINR), etc.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   transmitting, from a user equipment (UE) to a serving radio access technology (RAT), data while on a packet switched (PS) data call with the serving RAT;
   determining, at the UE, whether a traffic volume report event condition is satisfied;
   determining, at the UE, whether a neighbor cell measurement event condition is satisfied; and
   delaying, at the UE, transmission of an uplink (UL) reconfiguration message to the serving RAT when the traffic volume report event condition is satisfied and the neighbor cell measurement event condition is satisfied, a transition from the serving RAT to a non-serving preferred RAT being initiated when the neighbor cell measurement event condition is satisfied.

2. The method of claim 1, in which the uplink reconfiguration message is a UE traffic volume report that indicates whether data in a UE buffer is less than or greater than a network indicated threshold.

3. The method of claim 1, in which the transition is a handover to the non-serving preferred RAT.

4. The method of claim 1, in which the transition is a re-direction to the non-serving preferred RAT.

5. The method of claim 1, in which a time to trigger (TTT) measurement for at least one neighbor cell of the preferred RAT is actively running during the transition.

6. The method of claim 1, in which the non-serving RAT is a higher priority RAT.

7. The method of claim 1, in which:
   the non-serving preferred RAT is an equal priority or lower priority RAT; and
   the transition is initiated when a serving RAT signal quality is less than a threshold.

8. An apparatus for wireless communication, comprising:
   means for transmitting, from a UE) to a serving radio access technology (RAT), data while on a packet switched (PS) data call with the serving RAT;
   means for determining, at the UE, whether a traffic volume report event condition is satisfied;
   means for determining, at the UE, whether a neighbor cell measurement event condition is satisfied; and
   means for delaying, at the UE, transmission of an uplink (UL) reconfiguration message to the serving RAT when the traffic volume report event condition is satisfied and the neighbor cell measurement event condition is satisfied, a transition from the serving RAT to a non-serving preferred RAT being initiated when the neighbor cell measurement event condition is satisfied.

9. The apparatus of claim 8, in which the uplink reconfiguration message is a UE traffic volume report that indicates whether data in a UE buffer is less than or greater than a network indicated threshold.

10. The apparatus of claim 8, in which the transition is a handover to the non-serving preferred RAT.

11. A user equipment (UE) for wireless communication, comprising:
    a memory; and
    at least one processor coupled to the memory and configured:
    to transmit, to a serving radio access technology (RAT), data while on a packet switched (PS) data call with the serving RAT;
    to determine whether a traffic volume report event condition is satisfied;
    to determine whether a neighbor cell measurement event condition is satisfied; and
    to delay, transmission of an uplink (UL) reconfiguration message to the serving RAT when the traffic volume report event condition is satisfied and the neighbor cell measurement event condition is satisfied, a transition from the serving RAT to a non-serving preferred RAT being initiated when the neighbor cell measurement event condition is satisfied.

12. The UE of claim 11, in which the uplink reconfiguration message is a UE traffic volume report that indicates whether data in a UE buffer is less than or greater than a network indicated threshold.

13. The UE of claim 11, in which the transition is a handover to the non-serving preferred RAT.

14. The UE of claim 11, in which the transition is a re-direction to the non-serving preferred RAT.

15. The UE of claim 11, in which a time to trigger (TTT) measurement for at least one neighbor cell of the preferred RAT is actively running during the transition.

16. The UE of claim 11, in which the non-serving RAT is a higher priority RAT.

17. The UE of claim 11, in which:
the non-serving preferred RAT is an equal priority or lower priority RAT; and
the at least one processor is further configured to initiate the transition when a serving RAT signal quality is less than a threshold.

18. A non-transitory computer-readable medium having program code recorded thereon for wireless communication, the program code comprising:
program code to transmit, from a user equipment (UE) to a serving radio access technology (RAT), data while on a packet switched (PS) data call with the serving RAT;
program code to determine, at the UE, whether a traffic volume report event condition is satisfied;
program code to determine, at the UE, whether a neighbor cell measurement event condition is satisfied; and
program code to delay, at the UE, transmission of an uplink (UL) reconfiguration message to the serving RAT when the traffic volume report event condition is satisfied and the neighbor cell measurement event condition is satisfied, a transition from the serving RAT to a non-serving preferred RAT being initiated when the neighbor cell measurement event condition is satisfied.

19. The non-transitory computer-readable medium of claim 18, in which the uplink reconfiguration message is a UE traffic volume report that indicates whether data in a UE buffer is less than or greater than a network indicated threshold.

20. The non-transitory computer-readable medium of claim 18, in which the transition is a handover to the non-serving preferred RAT.

* * * * *